(12) United States Patent
Roussin-Bouchard et al.

(10) Patent No.: US 7,968,040 B2
(45) Date of Patent: Jun. 28, 2011

(54) METHOD FOR FABRICATING A CONNECTOR FOR FUEL CELL SYSTEM, CONNECTOR AND SYSTEM OBTAINED BY SUCH A METHOD

(75) Inventors: Xavier Roussin-Bouchard, Villard de Lans (FR); Denis Sirac, Moirans (FR); Nancy Clary, La Combe de Lancey (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 135 days.

(21) Appl. No.: 12/185,291

(22) Filed: Aug. 4, 2008

(65) Prior Publication Data
US 2009/0104504 A1   Apr. 23, 2009

(30) Foreign Application Priority Data

Aug. 6, 2007   (FR) ...................................... 07 56962

(51) Int. Cl.
*B29C 49/04* (2006.01)
*B29C 49/20* (2006.01)

(52) U.S. Cl. ........ 264/531; 264/514; 264/515; 264/523; 264/163

(58) Field of Classification Search ........................ None
See application file for complete search history.

(56) References Cited

U.S. PATENT DOCUMENTS

| 4,419,323 | A * | 12/1983 | Winchell ...................... 264/523 |
|---|---|---|---|
| 6,541,148 | B1 | 4/2003 | Walsh et al. |
| 2002/0148427 | A1 | 10/2002 | Jones et al. |
| 2005/0064269 | A1 | 3/2005 | Kurtz et al. |
| 2006/0035135 | A1 | 2/2006 | Patel et al. |
| 2006/0060244 | A1 | 3/2006 | Eggum et al. |
| 2006/0177710 | A1 | 8/2006 | Tajima et al. |

FOREIGN PATENT DOCUMENTS

| EP | 1 104 877 | 6/2001 |
|---|---|---|
| WO | WO 2008 058165 | 5/2008 |

OTHER PUBLICATIONS

Search Report for FR 0756962, 2008.

* cited by examiner

*Primary Examiner* — Monica A Huson
(74) *Attorney, Agent, or Firm* — Christopher J. Cronin

(57) ABSTRACT

Method for fabricating a fluid connector for fuel cell system:
(a) a thermoplastic parison (19) is extruded,
(b) the parison is placed in a mould (10a, 10b),
(c) an intermediate zone is created, in which the two walls of the parison are joined in a gastight manner,
(d) a gas is blown inside the parison into each cavity of the mould, and
(e) the mould is opened.

7 Claims, 3 Drawing Sheets

METHOD FOR FABRICATING A CONNECTOR FOR FUEL CELL SYSTEM, CONNECTOR AND SYSTEM OBTAINED BY SUCH A METHOD

CROSS-REFERENCE TO RELATED APPLICATIONS

This application claims the benefit of priority under 35 U.S.C. §119(a) and (b) to French Application No. 0756962, filed Aug. 6, 2007, the entire contents of which are incorporated herein by reference.

BACKGROUND

The present invention relates to methods for fabricating connectors for fuel cell systems, and to the connectors and systems obtained by such fabrication methods.

More particularly, the invention relates to a method for fabricating connectors for fuel cell systems.

Conventionally, a fuel cell system comprises a fuel cell stack, which comprises a cathode compartment, in which oxygen from the air is reduced, with the production of water, and an anode compartment, where the oxidation of hydrogen takes place.

An ion exchange type membrane physically separates the cathode and anode compartments, which are connected via an external electrical circuit.

The cathode compartment is provided with an air intake conduit, and with an exit conduit for the oxygen-depleted air, mixed with water.

Similarly, the anode compartment is caused to communicate with a hydrogen intake line, and with an exit line for the hydrogen consumed.

The latter is mixed with a fraction of water, which has been produced at the cathode and has crossed the separation membrane. Nitrogen, which has diffused across the said membrane, is also mixed with the hydrogen, and also with any impurities initially present in the hydrogen. These fluids circulate between the fuel cell stack and one or more fluid connectors of the system, which have the function, inter alia, of providing this circulation throughout the system.

Such connectors have already been described in numerous documents. However, they are conventionally fabricated in the form of a moulded part forming a plurality of channels upon which upper and lower covers are added, offering a function of a fluid interface of the channels with the other elements of the system. Reference can be made for example to U.S. Pat. No. 6,541,148.

However, attempts continue to be made to improve such connectors, in particular the gastightness between the various channels, while using industrially reliable fabrication methods.

SUMMARY OF THE INVENTION

For this purpose, a method is provided for fabricating a fluid connector for fuel cell systems comprising the following steps:

(a) a thermoplastic parison comprising two opposite walls is extruded, (b) the parison is placed in a mould defining first and second cavities spaced from one another, (c) the mould is closed in order to create, in a zone of the mould lying between the first and second cavities, an intermediate zone in which the two walls of the parison are joined in a gastight manner, (d) a gas is blown inside the parison into each cavity, to press the walls of the parison on the mould in each cavity to form a conduit in each cavity, and (e) the mould is opened.

Thanks to these arrangements, a simple and well established method is implemented for producing a part in a single step, intrinsically having an excellent seal between its fluid channels.

In certain embodiments of the invention, use may optionally further be made of one and/or another of the following arrangements:

during step (b), an end piece is placed in a cavity of the mould, during step (d), the parison is attached to the end piece in a gastight manner, the method further comprising a step (f) during which the parison is perforated to form a fluid communication between the end piece and the conduit formed in the cavity;

prior to step (b), the end piece is moulded, and a perforation member adapted to implement step (f) is fixed in the end piece;

the parison and the end piece are made from materials having the same melting point, preferably from the same material;

one end of a connecting tube is force fitted into an end piece in a gastight manner, the said connecting tube comprising at least one other end adapted to be fluidly connected to another end piece or to a fuel cell;

a control member adapted for controlling the gas flow in the connecting tube is placed in at least one connecting tube;

at least two parts are assembled, each obtained by a method according to one of the preceding features.

According to another aspect, the invention relates to a fluid connector for fuel cell systems comprising at least two conduits separated from one another in a gastight manner by an intermediate zone obtained by joining two opposite walls of an extruded parison, the conduits being formed in cavities of the mould by blowing a gas in the parison into the cavities.

According to the invention, the at least two conduits (or channels) sealed from one another with regard to the fluid and the intermediate zone, form a single piece. This means that the at least two "closed" conduits and the intermediate zone are formed of a single piece and do not require a first moulded part cooperating with a distinct additional cover (to close the said conduits).

In certain embodiments of the invention, use may optionally further be made of one and/or another of the following arrangements:

the fluid connector further comprises an end piece made from a material having the same melting point as the parison material, in fluid communication with a conduit, and comprising at least one first end joined in a gastight manner to the conduit, and a second end adapted to be fluidly connected to another end piece or to a fuel cell.

According to another aspect, the invention relates to an intermediate product adapted to be formed into a fluid connector for a fuel cell system, the intermediate product comprising:

at least two conduits separated from one another in a gastight manner by an intermediate zone, an end piece comprising at least a first end joined to a conduit, and a second end adapted to be fluidly connected to another end piece or to a fuel cell.

The first end being closed.

According to another aspect, the invention relates to a fuel cell system and such a fluid connector or one obtained according to such a method, or obtained from such an intermediate product, the connector being fluidly connected to the fuel cell.

BRIEF DESCRIPTION OF THE FIGURES

Other features and advantages of the invention will appear from the following description of one of its embodiments, provided as a non-limiting example, in conjunction with the appended figures wherein.

DETAILED DESCRIPTION OF THE INVENTION

Figure 1:
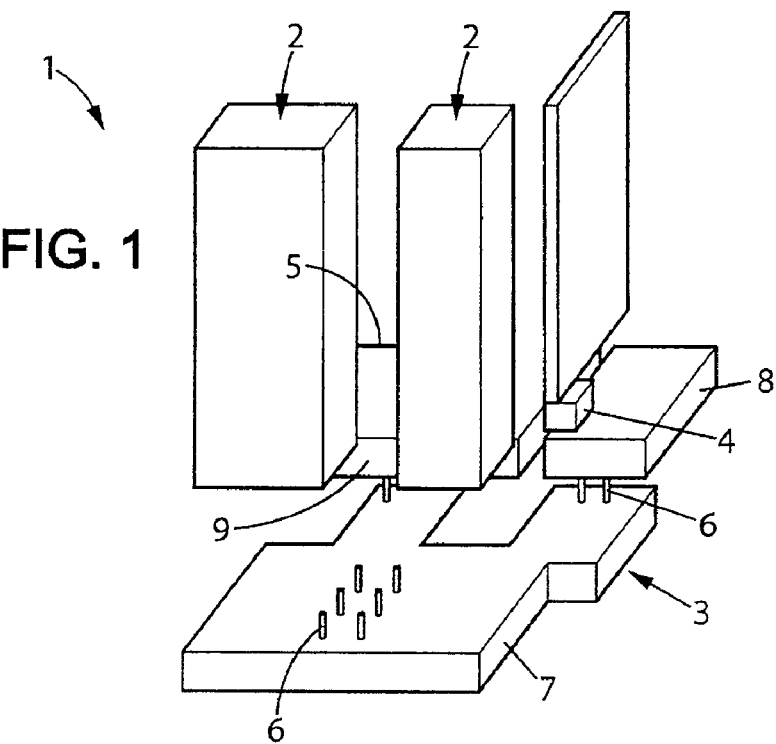
FIG. 1 is a schematic perspective view of one example of a fuel cell system.

In the various figures, the same reference numerals denote identical or similar elements.

FIG. 1 shows an example of a fuel cell system which conventionally comprises one or more cells 2 providing an electric power supply to a load based on flows of fuel (for example hydrogen) and an oxidant (for example air) in each of the cells. These cells comprise channels which receive the fuel and the oxidant and guide them towards appropriate anode and cathode regions of the cell. Other channels also guide the unconsumed fuel and oxidant outside the cell. Moreover, other fluids, such as refrigerant fluids, are also capable of flowing in each cell.

The system also comprises a fluid connector 3 for circulating the fluids in the cells 2, and for communicating with the other elements of the fuel cell system, such as the fuel line 4 (for example an $H_2$ line), the humidifier 5 or other.

In the purely illustrative example shown, the connector 3 is made in three distinct parts connected together and to the other components of the system by channels 6. Some of these channels are shown unconnected to the fuel cells in FIG. 1 to make the drawing more legible. These three parts are a connector called "lower" 7, an oxidant connector 8 and a fuel connector 9.

In the following discussion, a method is described for fabricating the lower connector 7, with the understanding that such a method could be applied to the fabrication of the oxidant connector 8, the fuel connector 9 or even a unitary connector grouping these three parts in an alternative embodiment.

Figure 2:
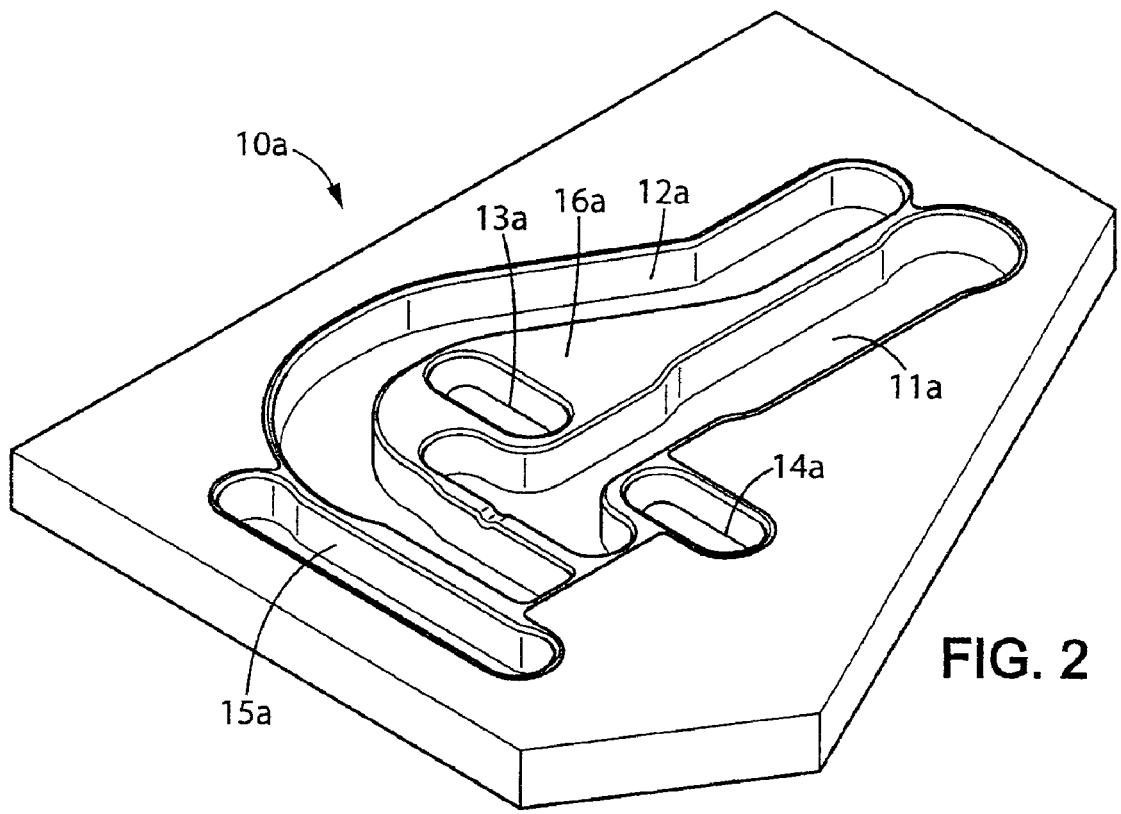
FIG. 2 is a perspective view of a half-mould according to an exemplary embodiment.
Figure 3:
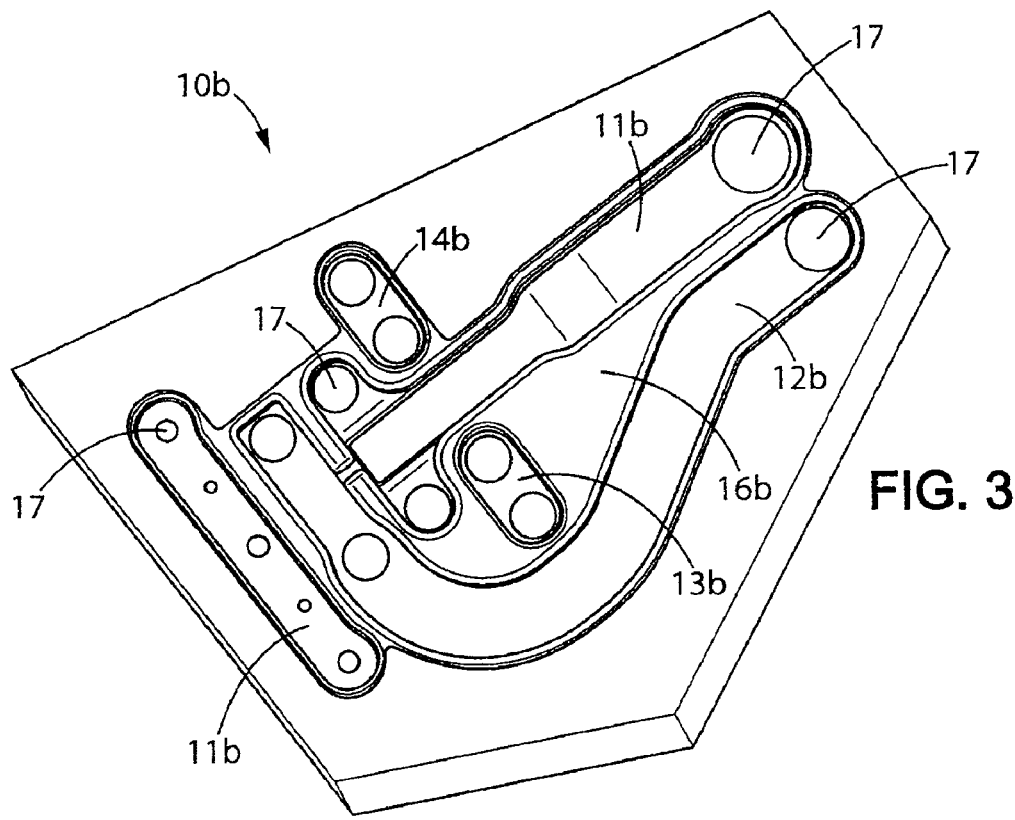
FIG. 3 is a perspective view of a complementary half-mould in FIG. 2.

A mould is available in two parts corresponding to the basic shape of the lower connector 7. This mould has a bottom half 10a shown in FIG. 2 and a complementary upper half 10b shown in FIG. 3. The lower half is intended to mould the bottom part of the connector, and the upper part its covering part.

The mould defines a set of cavities including a substantially linear main cavity 11a, 11b, a substantially curved main cavity 12a, 12b, and small transverse cavities 13a, 13b, 14a, 14b et 15a, 15b.

Each cavity may have a variable profile and/or depth according to the needs of the application.

The mould further comprises a plurality of intermediate zones 16a, 16b having planar surfaces, connecting the cavities together.

In the upper half 10b of the mould, a number of openings 17 are formed at the bottom of the cavities.

FIGS. 4a-4e show a fictitious cross section taken in the mould at an opening 17 of a first cavity (for example the cavity 11b, 11a) and at a portion of a second cavity (for example 14b, 14a) without opening. The two cavities are connected together by a planar intermediate zone 16b, 16a.

Figure 4A:
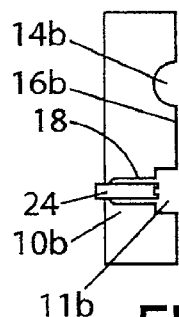
FIG. 4a is a schematic view of a cross section illustrating a step of a fabrication method using a mould of the type shown.

As shown in FIG. 4a, the two parts 10a, 10b of the mould are located at a distance from one another. An adapted end piece 18 is placed in each of the openings 17 of the upper part of the mould 10b. Such an end piece comprises at least one first end intended to be connected to the conduits formed in the connector, and at least one second end intended to be fluidly connected to an external component or to another conduit of the connector. The outer surface of the end piece may be shaped to provide fastening reliefs. This end piece is for example previously obtained by moulding a thermoplastic part. The cylindrical end piece is slipped around a striker punch 24 that is movable with regard to the mould.

Figure 4B:
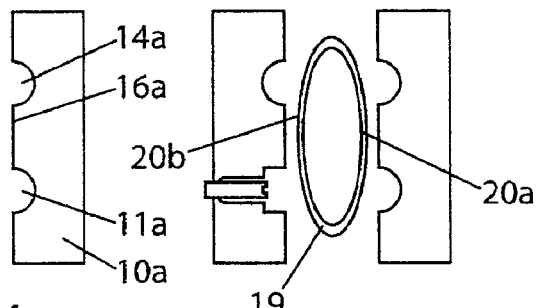
FIG. 4b is a schematic view of a cross section illustrating a step of a fabrication method using a mould of the type shown.

Then, as shown in FIG. 4b, a plastic parison 19 is extruded into the mould. This parison consists of a thermoplastic, for example having an identical melting point (to within 5° C.) to the material of the end pieces. It may for example be made of the same material. The parison has opposing inside walls 20a, 20b.

Figure 4C:
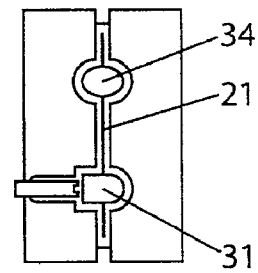
FIG. 4c is a schematic view of a cross section illustrating a step of a fabrication method using a mould of the type shown.

As shown in FIG. 4c, the mould is closed. In the intermediate zone 16b, 16a of the mould, the walls of the halves 10a and 10b are nearly in contact, so that the walls 20a, 20b of the parison are joined at this level, thereby forming an intermediate zone 21 of the connector 7. A hot air is blown, by means known per se, perpendicular to the plane of the drawing. This hot air is blown in the parison into each cavity, in order to thrust the outer walls of the parison into contact with the wall of the mould in each cavity. A first fluid conduit 31 is thereby formed in the cavity 11a, 11b and a second fluid conduit 34 in the cavity 14a, 14b, which are sealed from one another with regard to the fluid via the intermediate zone 21. The deformation causes a change in thickness of the parison. This thickness is a minimum at the bottom of the conduit. The end parts (at the top and bottom in the figure) of the parison are also joined together. During this operation, merging takes place in the cavity 11b between the material of the parison 19 and the first end of the end piece 18. At this stage, there is therefore no fluid communication between the channel and the end piece, which is closed at its first end by the parison material. The first end of the end piece may have a shape specially adapted to merge with the parison.

After the blowing, the channels used to blow the air are closed, for example, by crushing. An intermediate product of the fabrication method is thereby obtained.

The use of materials having similar melting points serves to obtain narrow geometrical tolerances and a perfect seal with the other elements.

Figure 4D:
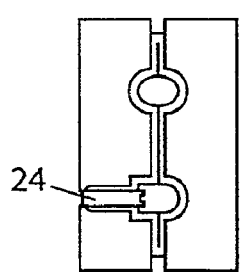
FIG. 4d is a schematic view of a cross section illustrating a step of a fabrication method using a mould of the type shown.

As shown in FIG. 4d, the striker punch 24 is then activated in order to create an opening between the conduit 31 and the interior of the end piece 18. This perforation step may alternatively be carried out later during the fabrication method, by machining for example.

Figure 4E:
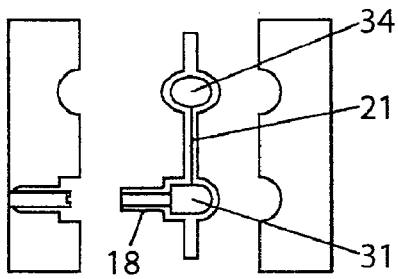
FIG. 4e is a schematic view of a cross section illustrating a step of a fabrication method using a mould of the type shown.
Figure 5:
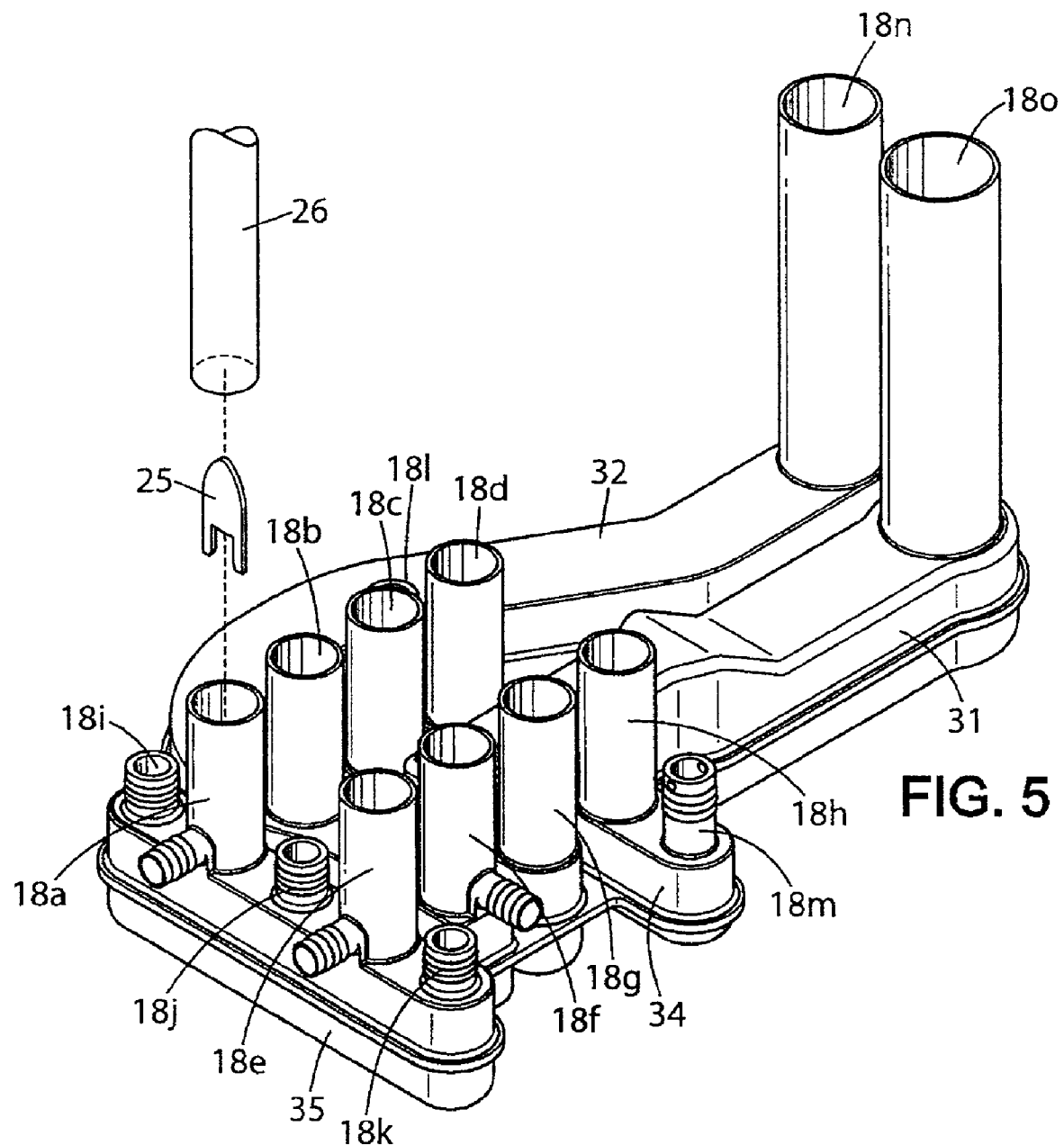
FIG. 5 is a perspective view of a fluid connector obtained according to an exemplary embodiment.

As shown in FIG. 4e, after cooling, the mould is opened by separating the two parts thereof, in order to obtain the fluid connector shown in FIG. 5.

A single piece is thereby obtained with channels that may have complex shapes with different geometries with precise junction zones very distant from the joint plane.

FIG. 5 shows a connector 7 obtained by the method described above, comprising a plurality of conduits:
- 31, which corresponds to the cavities 11a, 11b,
- 32 which corresponds to the cavities 12a, 12b,
- 34 which corresponds to the cavities 14a, 14b,
- 35 which corresponds to the cavities 15a, 15b, and
- a conduit not shown in this figure corresponding to the cavities 13a, 13b.

Furthermore, a plurality of end pieces 18a-18o are fluidly connected to respective conduits.

At this stage, it is possible to introduce control members 25 such as balls, valves and/or flaps, into one or more end pieces 18a-18o, thereby regulating the fluid flow in the end piece, for example in order to implement a fluid recirculation as described in WO 03/005,472.

The end pieces 18a-18o may serve to connect the fluid connector to another component of the system, such as another connector for example or to the components of the fuel cell identified above. For this purpose, a pipe 26 can be force fitted for example onto the free end of the end piece opposite the end opening into the conduit.

For purely illustrative purposes, in the present embodiment, the end pieces 18i and 18l are connected together, the end pieces 18a and 18e are connected to the H$_2$ connector, the end pieces 18n and 18o are connected to the air connector, the end pieces 18a-18h being connected to the fuel cells.

As an alternative or in addition, rather than connecting the connector shown in FIG. 5 to the various components of the system by external pipes 26, one or more other pieces may be used, also obtained by the fabrication method described above. Intersecting conduits can thereby be obtained, with excellent leak-free properties.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for fabricating a fluid connector for fuel cell system comprising the following steps:
   (a) a thermoplastic parison (19) comprising two opposite walls is extruded,
   (b) the parison is placed in between bottom and upper mould halves (10a, 10b), the upper mould half (10b) defining a first open cavity (11b) and a second open cavity (14b) and having an intermediate zone (16b), the bottom mould half (10a) defining a first open cavity (11a) and a second open cavity (14a) and having an intermediate zone (16a), the mould halves (10a, 10b) when closed together define a first closed cavity comprised of said first open cavities (11a, 11b) of the bottom and upper mould halves (10a, 10b) and a second closed cavity comprised of said second open cavities (11a, 11b) of the bottom and upper mould halves (10a, 10b), the first and second closed cavities being spaced from one another, the mould halves (10a, 10b) which when closed together draw the intermediate zones (16a, 16b) of the bottom and upper mould halves (10a, 10b) into close proximity to one another,
   (c) the mould halves (10a, 10b) are closed together in order to join together, in between said intermediate zones (16a, 16b) the two walls of the parison in a gastight manner,
   (d) a gas is blown inside the parison into each of said first and second closed cavities, to press the walls of the parison on the mould in each of said first and second closed cavities to form first and second fluid conduits (31, 34) in said first and second closed cavities, respectively, and
   (e) the mould is opened, wherein,
   during step (b), an end piece is placed in an opening in one of the mould halves that opens into a respective open cavity,
   during step (d), the parison is attached to the end piece in a gastight manner, and
   the method further comprises a step (f) during which the parison is perforated to form a fluid communication between the end piece and the fluid conduit formed in the cavity adjacent to the end piece.

2. The fabrication method of claim 1, wherein, prior to said step (b), the end piece is moulded, and a perforation member adapted to implement step (f) is fixed on the end piece.

3. The fabrication method of claim 1, wherein the parison and the end piece are made from materials having a same melting point.

4. The fabrication method of claim 1, wherein one end of a connecting tube is force fitted into the end piece in a gastight manner, said connecting tube comprising at least one other end adapted to be fluidly connected to another end piece or to a fuel cell.

5. The fabrication method of claim 4, wherein a control member adapted for controlling the gas flow in the connecting tube is placed in at least one connecting tube.

6. A method for fabricating a fuel cell fluid connector in which at least two parts are assembled, each of which is obtained by performing the method of claim 1.

7. The fabrication method of claim 1, wherein the parison and the end piece are made from a same material.

* * * * *